United States Patent [19]

Wilkinson et al.

[11] Patent Number: 4,835,626

[45] Date of Patent: May 30, 1989

[54] PRESERVING A RECORD OF TIMECODES USED IN EDITING A RECORDED DIGITAL VIDEO SIGNAL

[75] Inventors: James H. Wilkinson, Yokohama, Japan; Robin L. Lince, Hampshire, United Kingdom

[73] Assignee: Sony Corporation, Tokyo, Japan

[21] Appl. No.: 16,560

[22] Filed: Feb. 19, 1987

[30] Foreign Application Priority Data

Feb. 24, 1986 [GB] United Kingdom ............... 8604483

[51] Int. Cl.⁴ ............................................. G11B 27/00
[52] U.S. Cl. ............................... 360/14.3; 360/72.2; 358/311
[58] Field of Search ........................... 360/14.1–14.3, 360/722; 358/311

[56] References Cited

U.S. PATENT DOCUMENTS

| 4,098,664 | 10/1987 | Nichols et al. | 360/14.3 X |
| 4,340,916 | 7/1982 | Meneyes | 360/72.2 |
| 4,360,843 | 11/1982 | Meneyes et al. | 360/14.3 X |
| 4,394,694 | 7/1983 | Nisomiya et al. | 360/14.3 |

Primary Examiner—Aristotelis M. Psitos
Attorney, Agent, or Firm—Lewis H. Eslinger; Donald S. Dowden

[57] ABSTRACT

A method of processing timecode data in a recorded digital video signal comprises assigning a first timecode to a first timecode location in the signal during recording, assigning the first timecode to a second timecode location and assigning a current second timecode to the first timecode location during a first editing step, and in subsequent editing steps sequentially changing the timecode locations of the timecodes so that the current timecode is assigned to the first timecode location and the previous timecodes are shifted sequentially through the other timecode locations.

7 Claims, 4 Drawing Sheets

FIG. 3A.

| | | | | |
|---|---|---|---|---|
| 42 | 1 | UNITS OF MINUTES | 1 | 32 |
| 43 | 2 | | 2 | 33 |
| 44 | 4 | | 4 | 34 |
| 45 | 8 | | 8 | 35 |
| 46 | | | | 36 |
| 47 | | FIFTH BINARY GROUP | | 37 |
| 48 | | | | 38 |
| 49 | | | | 39 |
| 50 "1" | | SYNCHRONISATION BIT | | |
| 51 "0" | | SYNCHRONISATION BIT | | |
| 52 | 10 | TENS OF MINUTES | 10 | 40 |
| 53 | 20 | | 20 | 41 |
| 54 | 40 | | 40 | 42 |
| 55 | | BINARY GROUP FLAG BIT | | 43 |
| 56 | | | | 44 |
| 57 | | SIXTH BINARY GROUP | | 45 |
| 58 | | | | 46 |
| 59 | | | | 47 |
| 60 "1" | | SYNCHRONISATION BIT | | |
| 61 "0" | | SYNCHRONISATION BIT | | |
| 62 | 1 | UNITS OF HOURS | 1 | 48 |
| 63 | 2 | | 2 | 49 |
| 64 | 4 | | 4 | 50 |
| 65 | 8 | | 8 | 51 |
| 66 | | | | 52 |
| 67 | | SEVENTH BINARY GROUP | | 53 |
| 68 | | | | 54 |
| 69 | | | | 55 |
| 70 "1" | | SYNCHRONISATION BIT | | |
| 71 "0" | | SYNCHRONISATION BIT | | |
| 72 | 10 | TENS OF HOURS | 10 | 56 |
| 73 | 20 | | 20 | 57 |
| 74 | | UNASSIGNED BIT | | 58 |
| 75 | | FIELD-MARK BIT \| PHASE-CORRECTION BIT | | 59 |
| 76 | | | | 60 |
| 77 | | EIGHTH BINARY GROUP | | 61 |
| 78 | | | | 62 |
| 79 | | | | 63 |
| 80 "1" | | SYNCHRONISATION BIT | | |
| 81 "0" | | SYNCHRONISATION BIT | | |
| 82 | | | | |
| 83 | | | | 64 |
| 84 | | | | 65 |
| 85 | | CRC CODE \| SYNCHRONISATION WORD | | ⋮ |
| 86 | | | | |
| 87 | | | | |
| 88 | | | | 78 |
| 89 | | | | 79 |

FIG. 3B.

PRESERVING A RECORD OF TIMECODES USED IN EDITING A RECORDED DIGITAL VIDEO SIGNAL

BACKGROUND OF THE INVENTION

1. Field of the Invention

This invention relates to methods of and apparatus for processing timecode data in a recorded digital video signal.

2. Description of the Prior Art

It has been proposed to record timecode information on a track of a magnetic tape in digital video recording. This allows for automatic searching for a particular frame on a tape by providing a unique address for each recorded frame. This facility is particularly useful in video editing. In one arrangement, the timecode is recorded on a longitudinal track of the tape adjacent to the oblique digital video tracks.

A problem with this arrangement, in particular when editing, is that the longitudinally-recorded timecode is difficult or impossible to read during slow-motion or freeze-frame replay. Accordingly, it has been proposed to include the timecode data in the video tracks, this being termed a vertical-interval timecode (VITC). Standards for VITC have been established by the US Society of Motion Picture and Television Engineers (SMPTE) and the European Broadcasting Union (EBU). However, during complex editing operations, timecodes from earlier generation recordings are lost, and therefore it is necessary to compile separate edit lists if historical records of the editing process are to be maintained. This information will be lost when a program is finally edited and the edit list destroyed.

SUMMARY OF THE INVENTION

One object of the present invention is to provide a method of processing timecode data in a recorded digital video signal wherein timecodes from previous editing steps are preserved.

Another object of the present invention is to provide a method of processing timecode data in a recorded digital video signal wherein previous editing generation timecodes are moved sequentially down a stack and are re-recorded.

Another object of the present invention is to provide apparatus for processing timecode data wherein earlier timecodes are preserved during a sequence of editing steps by being assigned to new timecode locations and re-recorded.

According to the present invention there is provided a method of processing timecode data in a recorded digital video signal, the method comprising:

assigning a first timecode to a first timecode location in the signal during recording;

assigning the first timecode to a second timecode location and assigning a current second timecode to the first timecode location during a first editing step; and in subsequent editing steps sequentially changing the timecode locations of the timecodes so that the current timecode is assigned to the first timecode location and the previous timecodes are shifted sequentially through the other timecode locations.

According to the present invention there is also provided apparatus for processing timecode data in a recorded digital video signal, the apparatus comprising:

means for assigning a first timecode to a first timecode location in the signal during recording;

means for assigning the first timecode to a second timecode location and for assigning a current second timecode to the first timecode location during a first editing step; and means operative in subsequent editing steps, sequentially to change the timecode locations of the timecodes so that the current timecode is assigned to the first timecode location and the previous timecodes are shifted sequentially through the other timecode locations.

Since the previous multiple timecodes are retained in the video signal, full editing information is preserved even after the final editing stage when the edit list is destroyed.

The above, and other objects, features and advantages of this invention will be apparent from the following detailed description of illustrative embodiments which is to be read in connection with the accompanying drawings.

BRIEF DESCRIPTION OF THE DRAWINGS

FIGS. 3A-3B diagram are showing a vertical-interval timecode format;

DESCRIPTION OF THE PREFERRED EMBODIMENTS

In order to provide a plurality of timecodes, one line per field of the video signal can be used. In a 625-line television system this could be line 20, 21 or 22 in the first field and line 333, 334 or 335 in the second field. It is necessary for a particular line to be selected for a specific standard, and thereafter that line is used for timecode data. The available space is defined for the required number of timecodes, for example sixteen.

In the 4:2:2 digital video recorder (DVTR) format, there are 1440 active data bytes per line. In accordance with SMPTE and EBU standards, a timecode occupies 72 active bits, including user and cyclic redundancy check (CRC) code bits. The timecode can readily be packaged into eighteen video bytes, using a four to eight bit coding map which provides easy interfacing and avoids the need to use $OO_H$ and $FF_H$ hexadecimal codes. Assuming only one line is available for the vertical-interval time-codes (VITCs), the total capacity can be as large as 1440/18=80 timecodes. If, as mentioned above, it is desired to provide sixteen timecodes, then 288 bytes (eighteen bytes per timecode) will be required. Since the total capacity of each line is 80, only 20% of the active line time will be occupied, so double recording may be provided if extra security is required.

Figure 1:
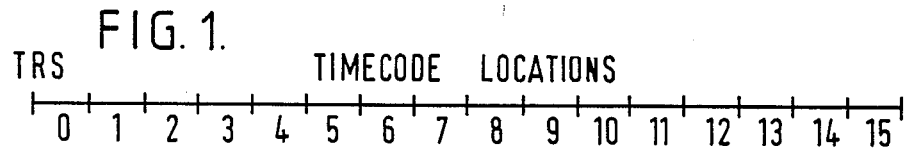
FIG. 1 is a diagram showing timecode locations with respect to a timing reference signal.

Referring to FIG. 1, the timecodes are utilized in a "push down stack" mode, in that at each generation, each timecode location is incremented by one. In other words, if the previous recording was generation N, then the current recording is N+1, assuming $0 \leq N \leq 15$.

This creates a space in location "0" which is then available for the new recording.

After sixteen generations, the firsst recorded timecode is lost, since it "falls off the stack". If it is desired to recall a timecode from K generations ago, it is only necessary to decode the timecode in location K.

As will be seen from FIG. 1, the timecodes follow a timing reference signal (TRS), the TRS being defined by CCIR recommendation 601 for the transmission of digital video signals, and are directly related thereto, so that the location of a particular timecode can readily be accessed.

Figure 2:
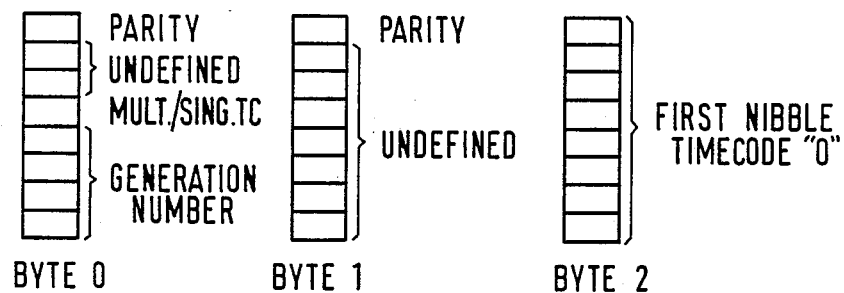
FIG. 2 is a diagram showing the first three bytes following the timing reference signal.

In order to provide for subsequent processing of the timecodes, control bits can be defined in the bytes between the timing reference signal and the timecode "0". One example of a control bit format is shown in FIG. 2, in which byte "0" has a single parity bit, two undefined bits and a multiple/single timecode (TC) determining bit. For example, if the TC determining bit is "0", this may indicate that the multiple timecode is inactive, that is, only a single timecode will be used in the signal processing; but if the bit is "1", it will be active. If multiple timecode is active, then the next four bits can define the generation number (maximum value fifteen) in simple binary form. Byte "1" includes a single parity bit and seven undefined bits, and therefore a total of nine bits in the bytes "0" and "1" is available for further use. Byte "2" is part of the current timecode "0", and subsequent bytes will form the remaining part of the current timecode "0" followed by the preceding timecodes.

Figure 3A:
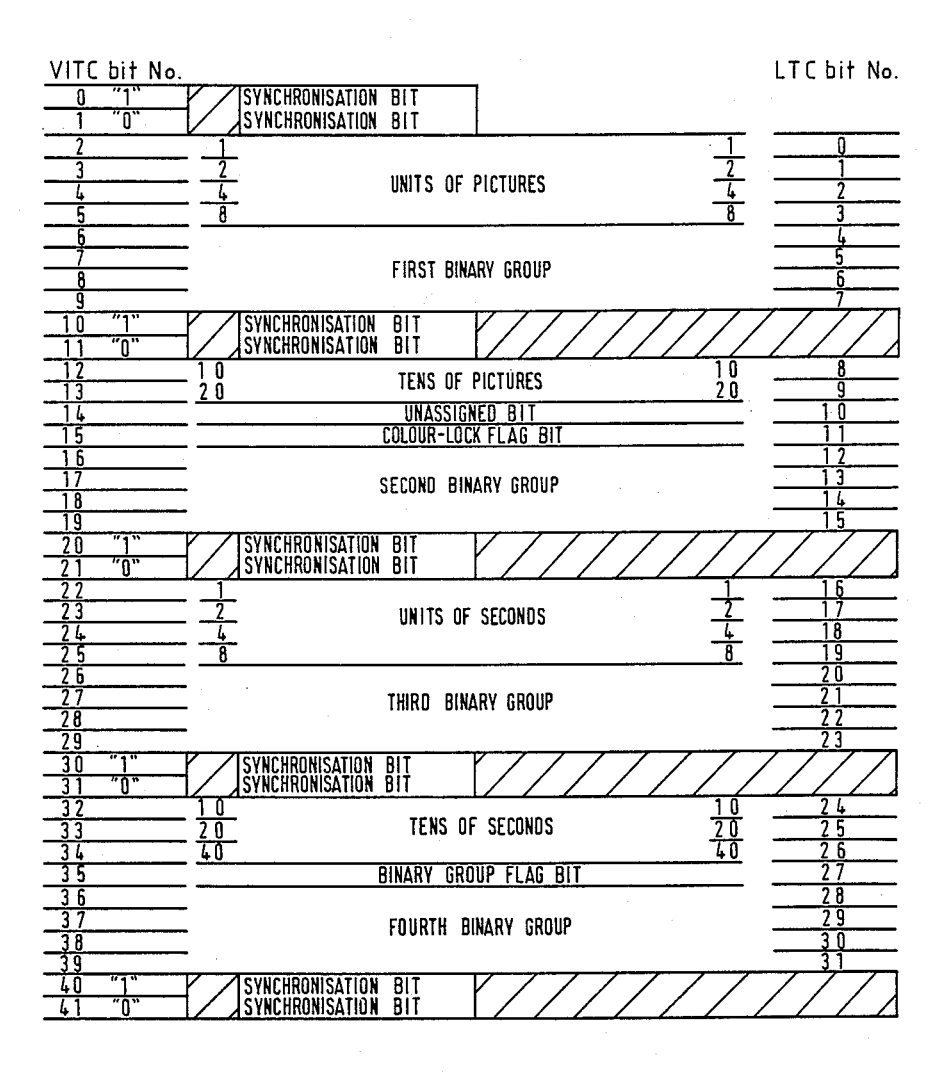

FIG. 3 shows the EBU timecode format which can be used in the present case (relative to a longitudinal timecode—LTC). The SMPTE code format which is similar except for the synchronising bit location is also suitable.

Figure 4:
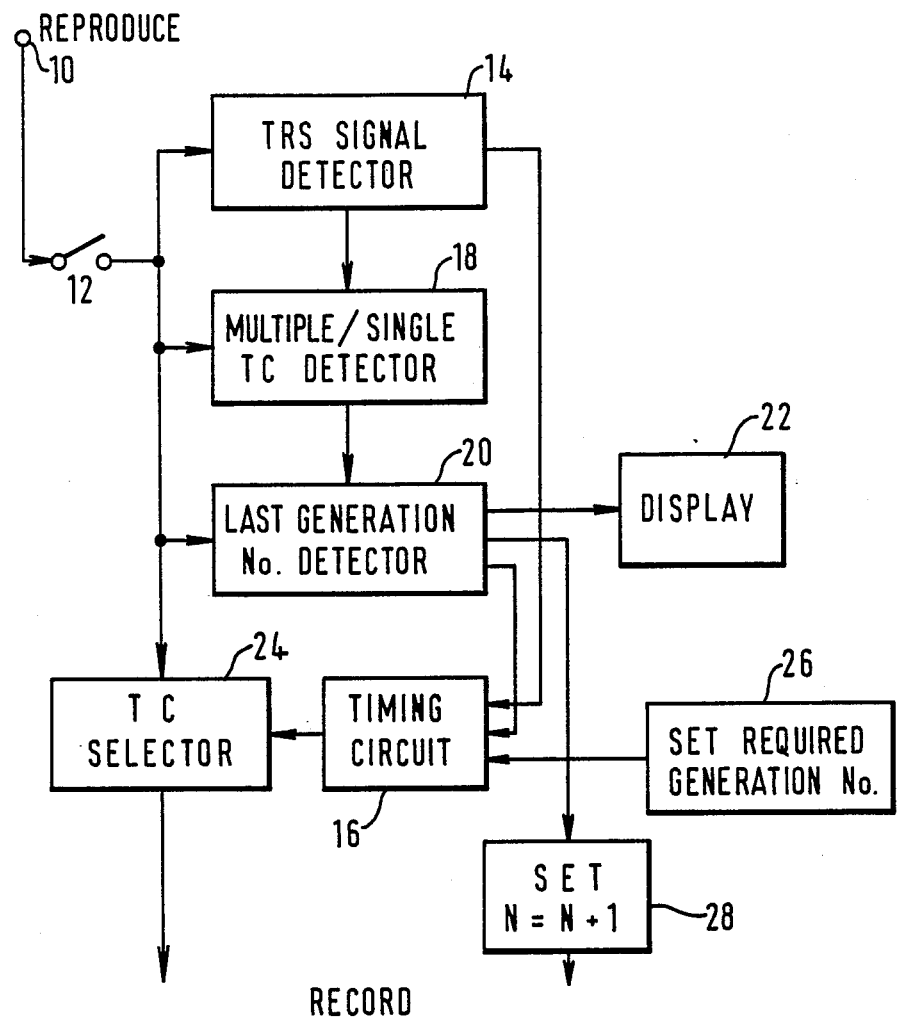
FIG. 4 shows in block diagrammatic form part of an embodiment of the invention.

FIG. 4 shows a circuit which can be used to process the timecode signals, for example during editing. A video signal reproduced from a first DVTR is supplied to an input terminal 10. A line selector 12 selects the particular line in each field containing the timecode data. A TRS detector 14 detects the TRS in the selected line to provide timing signals for a timing circuit 16, and also to enable a multiple/single timecode detector 18 which checks the appropriate bit (the fourth bit in the byte "0" in FIG. 2) for multiple or single timecodes. If multiple codes are detected, a last generation number detector 20 detects the appropriate generation number N (the fifth to eighth bits in the byte "0" in FIG. 2). This number N can be displayed on a display 22, if desired. The last generation number N data is fed to the timing circuit 16 which supplies a timing signal to a timecode selector 24, causing the specific timecode associated with the generation number N to be decoded and sent for subsequent processing and recording.

Alternatively, if a previous generation timecode is required, this can be provided by a set required generation number circuit 26.

An incrementing circuit 28 sets the generation number N to N+1 so as to vacate the location for subsequent generation numbers and provide the "push down stack" effect.

Figure 5:
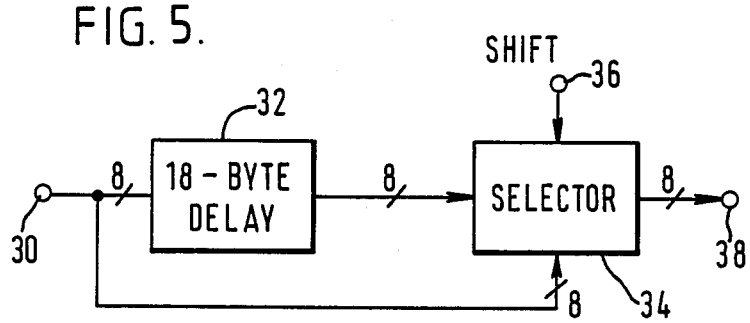
FIG. 5 shows in block diagrammatic form another part of the embodiment.
Figure 6A:
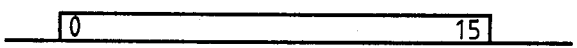
FIGS. 6A-D show time charts for describing the operation of the part of the embodiment shown in FIG. 5.
Figure 6B:
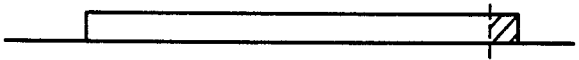
Figure 6C:
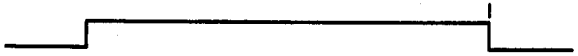
Figure 6D:

FIG. 5 shows a circuit which can be used to move the timecodes down the stack prior to re-recording. The timecodes reproduced from the first DVTR are supplied to an input terminal 30, which is connected to an 18-byte period delay device 32 and to one input of a selector 34, the other input of which receives the output of the delay device 32. A timecode shift control signal is supplied by way of a terminal 36 to control the selector 34, the output of which is connected to an output terminal 38.

The operation will be understood by referring also to the time charts of FIG. 6. FIG. 6A shows the timecodes "0" et seq, up to a maximum of timecode "15", and FIG. 6B shows these timecodes as delayed by the delay device 32 for supply to the selector 34. If the timecodes are not to be shifted, the timecode shift control signal is inactive, and the undelayed timecodes (FIG. 6A) are supplied by the selector 34 to the output terminal 38. If a shift is to occur, the timecode shift control signal is active (FIG. 6C) for fifteen timecode periods, causing the selector 34 to supply the delayed timecodes to the output terminal 38. In this case it is to be noted that the active duration of the timecode shift control signal is such that any timecode in the last (fifteenth generation) location (shown hatched) is lost, and the first location (shown hatched in FIG. 6D) is made vacant to permit recording therein of a new timecode "0".

Various modifications are of course possible without departing from the invention as defined by the appended claims, and in particular the line or lines used for the timecodes, and the number, length, content and format of the timecodes can be changed as required.

We claim:

1. A method of processing timecode data in a recorded digital video signal in order to facilitate a series of editing steps, the video signal having a plurality of sequential timecode locations and the method comprising:

assigning a first timecode to a first of said timecode locations in the video signal during recording;

assigning said first timecode to a second of said timecode locations and assigning a current second timecode to said first timecode location during a first of said editing steps; and in subsequent editing steps changing the timecode locations of the timecodes so that a new current timecode is assigned to said first timecode location and previous timecodes are shifted sequentially through succeeding ones of said timecode locations, a record of each of said timecodes being thereby preserved.

2. A method according to claim 1, wherein said video signal is organized into a plurality of fields separated by vertical intervals, each field and vertical interval including a plurality of lines, and wherein said assigning step comprises assigning the timecodes to locations in a line of the video signal occurring during a vertical interval.

3. A method according to claim 1 further comprising the step of respectively inserting control bits comprising generation number data before the timecodes.

4. A method according to claim 3 further comprising the step of including control bits that include data confirming that multiple timecodes are present in the video signal.

5. A method according to claim 1 wherein said timecodes are vertical interval timecodes.

6. Apparatus for processing timecode data in a recorded digital video signal in order to facilitate a series of editing steps, the video signal having a plurality of sequential timecode locations and the apparatus comprising:

means for assigning a first timecode to a first of said timecode locations in the video signal during recording;

means for assigning said first timecode to a second of said timecode locations and for assigning a current second timecode to said first timecode location during a first of said editing steps; and means operative in subsequent editing steps to change the timecode locations of the timecodes so that a new current timecode is assigned to said first timecode location and previous timecodes are shifted sequentially through succeeding ones of said timecode locations, a record of each of said timecodes being thereby preserved.

7. Apparatus according to claim 6 wherein said timecodes are vertical interval timecodes.

* * * * *